United States Patent
Kall

Patent Number: 5,840,431
Date of Patent: Nov. 24, 1998

[54] METHOD FOR PREFERABLY REGION-BY-REGION COATING OF A TRANSPARENT CARRIER PLATE

[75] Inventor: Klaus Kall, Offenburg, Germany

[73] Assignee: Fritz Borsi KG, Schutterwald, Germany

[21] Appl. No.: 727,636

[22] PCT Filed: Feb. 28, 1995

[86] PCT No.: PCT/DE95/00290

§ 371 Date: Oct. 15, 1996

§ 102(e) Date: Oct. 15, 1996

[87] PCT Pub. No.: WO95/28290

PCT Pub. Date: Oct. 26, 1995

[30] Foreign Application Priority Data

Apr. 14, 1994 [DE] Germany ............ 44 12 876.2

[51] Int. Cl.⁶ ............ B05D 5/06; B05D 1/36; B32B 3/00

[52] U.S. Cl. ............ 428/542.2; 428/542.6; 428/156; 428/172; 427/164; 427/404; 427/407.1; 156/196; 156/209

[58] Field of Search ............ 427/164, 165, 427/168, 402, 404, 407.1, 166; 428/542.6, 542.2, 156, 172; 65/60.2, 60.4; 156/196, 209, 303.1

[56] References Cited

U.S. PATENT DOCUMENTS

| | | | |
|---|---|---|---|
| 4,044,181 | 8/1977 | Edhlund | 428/40 |
| 4,363,844 | 12/1982 | Lewis et al. | 428/65 |
| 4,668,570 | 5/1987 | Esselborn et al. | 428/324 |
| 4,844,964 | 7/1989 | Schmidt et al. | 427/203 |
| 4,900,630 | 2/1990 | Suzuki et al. | 428/432 |
| 5,643,423 | 7/1997 | Kimock et al. | 204/192.35 |

FOREIGN PATENT DOCUMENTS

| | | |
|---|---|---|
| 0 068 608 A2 | 5/1982 | European Pat. Off. . |
| 0 215 324 A3 | 8/1986 | European Pat. Off. . |

*Primary Examiner*—Michael Lusignan
*Assistant Examiner*—Michael Barr
*Attorney, Agent, or Firm*—Hill & Simpson

[57] ABSTRACT

A method for coating a transparent carrier plate includes coating a backside of the carrier plate with a first chromatic layer, applying a non-opaque metallic blocking foil coating on top of the first chromatic layer, and applying a second chromatic layer on top of the non-opaque metallic blocking foil layer. The method results in a coated carrier plate having increased color intensity and brightness. Further, by varying the hues in the first and second chromatic layers, a resulting hue may be provided that is different from the hue of the first and/or second chromatic layer. In addition, the hues of the first and second chromatic layers may be varied over the surface area of the carrier plate.

18 Claims, 1 Drawing Sheet

METHOD FOR PREFERABLY REGION-BY-REGION COATING OF A TRANSPARENT CARRIER PLATE

BACKGROUND OF THE INVENTION

1. Field of the Invention

The invention is directed to a method for preferably selective, region-by-region coating of a transparent carrier plate, potentially composed of clear acrylic glass or the like, with a metallic blocking foil coat, whereby a first chromatic layer is applied to the one side of the carrier plate and a metallic blocking foil is applied adjacent to the chromatic layer in a roller-type embossing process.

2. Description of the Prior Art

German Letters Patent 42 24 463 discloses a method of the above species, whereby a chromatic layer composed of at least one color that converts the hue of the coating effected per se by the blocking foil into a different hue is arranged in at least a specific region of the carrier plate. When the blocking foil, for example, is thereby a matter of a silver foil and a yellow color is employed for the chromatic layer, a coating with a gold hue can thereby be achieved in a cost-beneficial way.

German Letters Patent 38 08 689 discloses a method of the species initially cited wherein, differing from the method of German Letters Patent 42 24 463, the color for the chromatic layer is selected such that the coloration of the coating effected with the blocking foil is promoted. When the blocking foil, for example, is thereby a gold foil, then the gold hue can be intensified by employing a yellow chromatic layer.

The traditional method, as disclosed by the aforementioned publications and of which it is characteristic that no further chromatic layer follows at that side of the metallic blocking foil facing away from the carrier plate, has definitely proven itself. However, it has been shown to be desirable to even further intensify the chromatic impression that is achieved, particularly as viewed from the outside, whereby, thus, the observer views the coating proceeding from the carrier plate side under illumination that likewise proceeds from the carrier plate side.

The invention is therefore based on the object of improving the known method to the effect that the chromatic impression of the finished coating is further intensified, particularly as viewed from the outside, whereby more pronounced chromatic nuances should also be possible upon employment of one and the same blocking foil.

SUMMARY

This object is inventively achieved in that a second chromatic layer is arranged adjoining the blocking foil at that side thereof facing away from the first chromatic layer.

Accordingly, the present invention provides an improved method of manufacturing a colorized carrier plate that comprises the steps of providing a transparent carrier plate, applying a first chromatic layer to the backside of the transparent carrier plate, applying a non-opaque metallic blocking layer on top of the first chromatic layer, and applying a second chromatic layer on top of the metallic blocking layer. By following this method, a carrier plate is provided with improved qualities including enhanced intensity and color control. Specifically, if the first chromatic layer and the second chromatic layer are of the same color or hue, the chromatic impression transmitted through the front face of the carrier plate will be intensified. In contrast, the second chromatic layer is of a different hue than the first chromatic layer, then the resulting color seen through the front side of the carrier plate may be a mixture of the two hues, or a different resulting color based upon the mixture of the two hues. In other words, the selection of the colors for the first chromatic layer and the second chromatic layer may be made depending upon the desired result, i.e. whether it is desired to have a higher brightness level, color saturation level or a specific color derived from the combination of two different hues.

Similarly, an improved colorized carrier plate is provided by the present invention which includes a transparent carrier plate having a a backside, the backside of the carrier plate being coated with a first chromatic layer, and the metallic blocking layer being coated with a second chromatic layer. Again, the first and second chromatic layers may be of substantially similar or substantially different hues.

In an embodiment, the first chromatic layer and/or the second chromatic layer are applied by silkscreening.

In an embodiment, the first chromatic layer and/or the second chromatic layer are applied by a spray coating technique.

In an embodiment, the first chromatic layer and/or the second chromatic layer are characterized as chromatic lacquer layers.

In an embodiment, the non-opaque metallic blocking layer is applied by way of an embossing process.

It can thereby be provided that coinciding colors can be employed for the first and for the second chromatic layer.

It can also be provided according to the invention that colors are selected for the first and for the second chromatic layer such that the hue of the coating effected by the blocking foil is converted into a different hue.

Finally, it can also be inventively provided that the coloration of at least one of the chromatic layers is varied region by region over the area of the carrier plate.

The invention is based on the surprising perception that one succeeds in achieving a significantly more intense chromatic impression, particularly in the exterior view, when the metallic blocking foil is embedded into a respective chromatic layer on both sides. When the two chromatic layers thereby have an identical color, the chromatic impression conveyed by the metallic blocking foil can be especially intensively reinforced. This thus succeeds, in particular, when, for example, a gold foil is embedded into a yellow chromatic layer on both sides. On the other hand, one also succeeds in achieving surprising color nuances in that different hues are selected for the two chromatic layers. A region by region variation of the coloration of the chromatic layers, i.e. at least one thereof, also potentially in view of only the intensity of the appertaining colorations, and further surprisingly effective effects can be achieved that are of particular advantage given employment for advertising displays and the like, as disclosed in detail in German Letters Patent 38 08 689.

BRIEF DESCRIPTION OF THE DRAWING

Further features and advantages of the invention derive from the following description in which an exemplary embodiment is explained in detail with reference to the schematic drawing.

DETAILED DESCRIPTION OF THE PRESENTLY PREFERRED EMBODIMENTS

Figure 1:
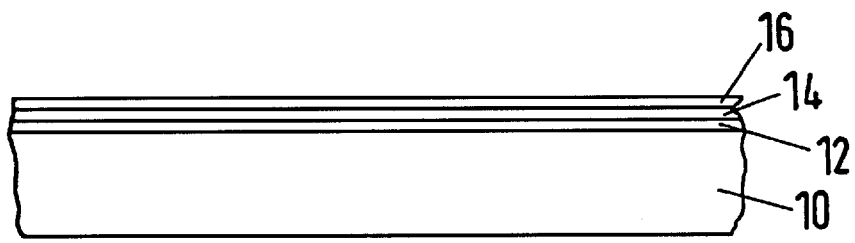
FIG. 1 is a sectional view of a carrier plate manufactured in accordance with the present invention.

As the drawing reveals, a carrier plate 10 preferably composed of clear acrylic glass carries a yellow chromatic layer 12 on what is its back side as seen proceeding from an observer, this yellow chromatic layer 12 having been applied in a silkscreening process, and, adjacent thereto, also carries a gold blocking foil coating 14 that has been applied in a roller-type embossing process onto the carrier plate 10 provided with the chromatic layer 14. A second chromatic layer 16, likewise yellow, has been applied in a silkscreening process onto that side of the blocking foil coating 14 facing away from the first chromatic layer 14.

When viewed and illuminated from the uncoated side of the carrier plate 10, the overall coating produces an intense gold impression.

Of course, one can also proceed such in the inventive method that at least one of the chromatic layers 12, 16 is not applied in a silkscreening process.

For example, the first chromatic layer 12 can be a chromatic lacquer layer, for example again with a yellow color or, on the other hand, with a red color or the like, whereas, for example, only the second chromatic layer 16 would be applied in the silkscreening process.

Both individually as well as in arbitrary combination, the features of the invention disclosed in the above specification, in the drawing as well as in the claims can be critical for realizing the various embodiments of the invention.

I claim:

1. A method of manufacturing a colorized plastic carrier plate comprising the following steps:

providing a transparent acrylic plastic carrier plate having a back side;

applying a first chromatic layer to the back side of the transparent carrier plate;

embossing a non-opaque metallic foil layer on top of the first chromatic layer with a roller-type embossing process;

applying a second chromatic layer on top of the metallic foil layer.

2. The method of claim 1 wherein the first chromatic layer is applied using a silkscreening process.

3. The method of claim 1 wherein the first chromatic layer is further characterized as being a chromatic lacquer layer.

4. The method of claim 3 wherein the first chromatic layer is applied by spraying.

5. The method of claim 1 wherein the second chromatic layer is applied using a silkscreening process.

6. The method of claim 1 wherein the first chromatic layer and the second chromatic layer have substantially the same color.

7. The method of claim 1 wherein the first chromatic layer and the second chromatic layer have substantially different colors.

8. The method of claim 1 further comprising the step of selecting a color for the first chromatic layer and selecting a color for the second chromatic layer so that a chromatic impression produced by the first and second chromatic layers and the metallic layer is increased.

9. The method of claim 1 further comprising the step of selecting a color for the first chromatic layer and selecting a color for the second chromatic layer so that the hue produced by the first and second chromatic layers and the metallic layer is different than the hue produced by the first chromatic layer alone.

10. The method of claim 1 wherein the hue of the first chromatic layer is varied across the surface area of the carrier plate.

11. The method of claim 1 wherein the hue of the second chromatic layer is varied across the surface area of the carrier plate.

12. A colorized plastic plate comprising:

a transparent acrylic plastic carrier plate having a back side and a front side and a surface area, the back side of the carrier plate being coated with a first chromatic layer, the first chromatic layer being embossed with a non-opaque metallic foil layer, the metallic foil layer being coated with a second chromatic layer, the colorized plastic plate both transmitting light and reflecting light through the front side of the plastic carrier plate and through the second chromatic layer.

13. The colorized plate of claim 12 wherein the first chromatic layer and the second chromatic layer have substantially the same color.

14. The colorized plate of claim 12 wherein the first chromatic layer and the second chromatic layer have substantially different colors.

15. The colorized plate of claim 12 wherein the hue of the first chromatic layer is varied across the carrier plate.

16. The colorized plate of claim 12 wherein the hue of the second chromatic layer is varied across the carrier plate.

17. The colorized plate of claim 12 wherein the first chromatic layer is applied using a silkscreening process.

18. The colorized plate of claim 12 wherein the second chromatic layer is applied using a silkscreening process.

* * * * *